April 21, 1942.    M. E. WIDELL    2,280,111
ELECTRIC WELDING
Filed June 30, 1939    2 Sheets-Sheet 1
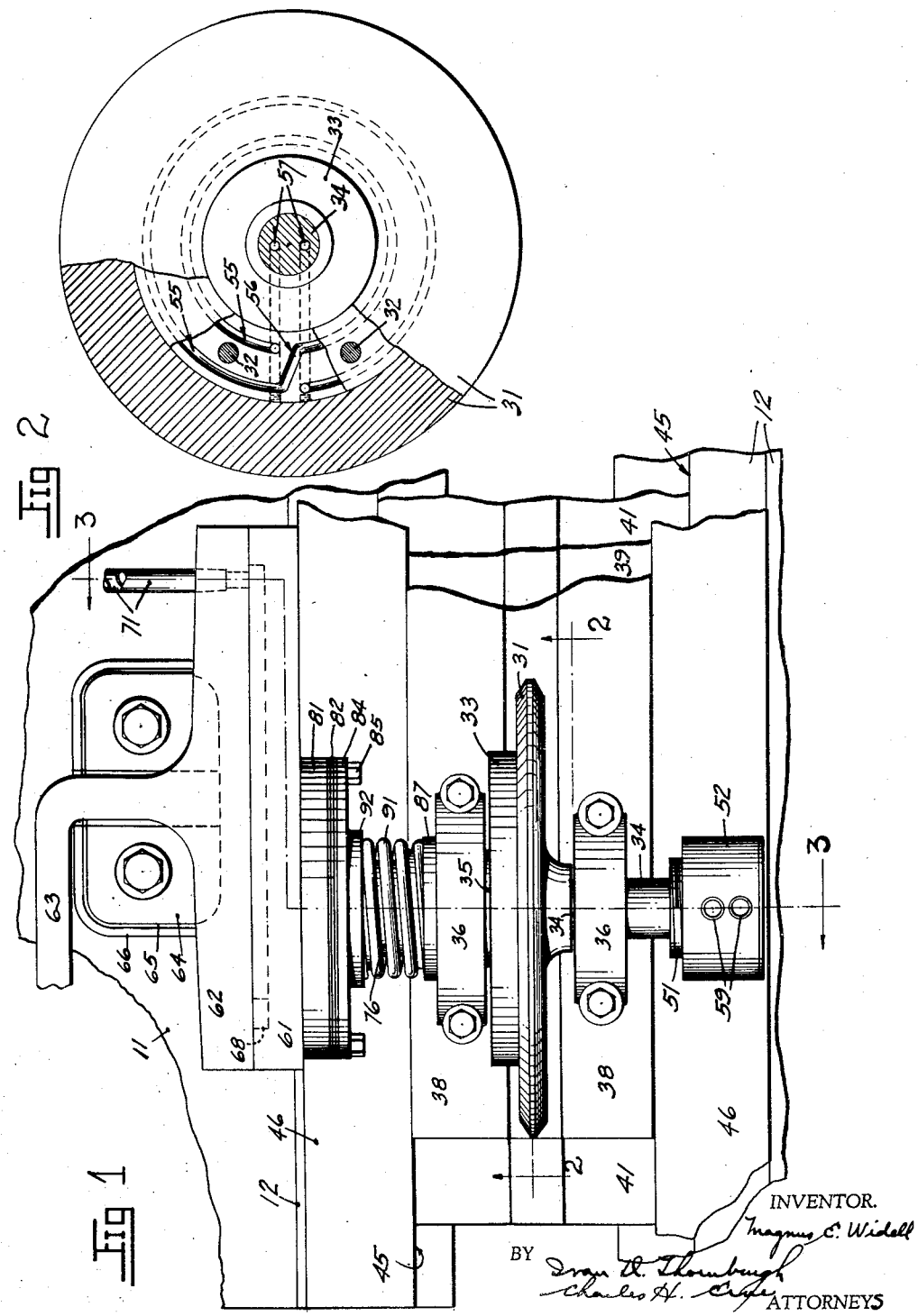

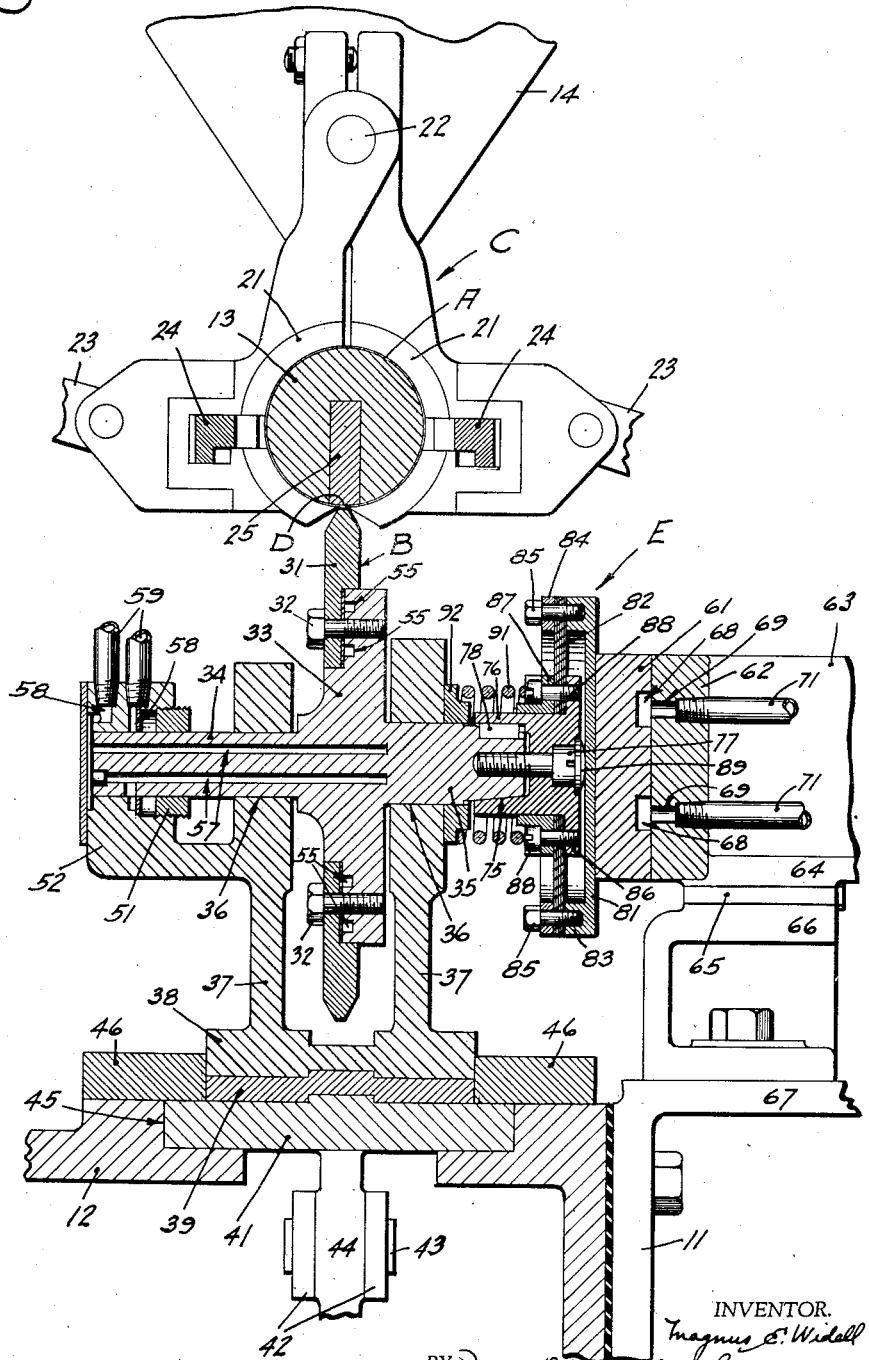

Patented Apr. 21, 1942

2,280,111

UNITED STATES PATENT OFFICE 2,280,111

ELECTRIC WELDING

Magnus E. Widell, Cincinnati, Ohio, assignor to American Can Company, New York, N. Y., a corporation of New Jersey Application June 30, 1939, Serial No. 282,279

9 Claims. (Cl. 219—6)

The present invention relates to electric welding apparatus wherein an extended line of weld is made by relative movement between an electrode and the work and has particular reference to an improved contact unit for obtaining a continuous electrical feeding connecting path, of a welding current, between movable and stationary parts so that the full welding energy will be effective at the electrode throughout such movement and during the welding operation.

In electrical stitch or continuous spot welding of seams of such work as metallic can bodies, the work has usually been held so that the full length of seam is in contact with one electrode of a welding head and the seam parts to be welded are then traversed by another electrode which is usually a roller or disc and which may be moved along the seam or the seam may be moved over the roller electrode.

In either case, there is usually one moving and one stationary electrode and the proper flow of welding current between a stationary lead wire or bus bar and the moving electrode has generally been made possible by a path formed of conducting cable wire or laminated strips of copper which bend and flex to allow for the relative movement between the electrodes. Since a considerable loop of such a copper lead must be provided this connecting medium is usually quite bulky and requires considerable space.

In the present invention all such flexible loop cable or laminated copper strips are eliminated, being replaced by a connecting slide unit which is so constructed as to insure a proper full contact between fixed and movable parts at all times regardless of the relative positions of such stationary and movable electrodes or the relative positions between an electrode and the work being welded.

An object of the present invention is the provision of a welding apparatus having at least one electrode movable relative to the work, wherein the proper electrical connection is at all times maintained with the moving electrode irrespective of its position relative to the work by the use of a sliding contact unit which is yieldable to accommodate any irregularities between sliding surfaces and which does not impose restrictions to the flow of welding current.

Another object is the provision of a welding and connecting unit in a welding machine which includes flexible instrumentalities comprising a movable sliding part held in close sliding contact with a feeder or collector bar mounted on a stationary frame part or member through which there is provided an efficient electrical path for a welding current to and from one or more electrodes which engage the work and such a path is uniformly maintained in all positions of the electrodes during a welding cycle.

A further object is the provision of such a welding and connecting unit which includes a flexibly mounted, spring-pressed rotatable contact head carried by a laterally shiftable, rotatable electrode wherein the pressure exerted between the head and an adjustable stationary feeder or collector bar is of a degree just sufficient to make the desired unrestricted electrical contact for the welding operation and at the same time properly locate the electrode relative to the work being welded.

Numerous other objects and advantages of the invention will be apparent as it is better understood from the following description, which, taken in connection with the accompanying drawings, discloses a preferred embodiment thereof.

Referring to the drawings:

Figure 1 is a plan view of a portion of the lower or movable electrode of a welding apparatus embodying the present invention;

Fig. 2 is a sectional view taken along the broken section line 2—2 in Fig. 1 with parts broken away and illustrating in some detail the movable electrode of the apparatus; and Fig. 3 is a vertical sectional view of such a welding apparatus illustrating the movable electrode, a can body constituting the work, a stationary support for the work including associated parts and also the sliding contact unit, this view being taken substantially along the broken line 3—3 in Fig. 1.

For the present purposes, the drawings illustrate only some of the principal working parts of a welding apparatus adapted to weld the side seam of a tubular can body, such body exemplifying work to be welded. This body is indicated by the letter A in Fig. 3.

The principal parts of the welding apparatus are mounted upon a frame 11 which, as illustrated in Figs. 1 and 3, supports a laterally extending table 12. This table carries the movable electrode, broadly designated B, and parts associated therewith.

The can body A is shown in Fig. 3 as being fully formed and resting on a support horn 13 which may be of the usual construction used in can body making machines. Body A has been brought into its tubular or cylindrical shape by mechanism forming no part of the present invention, these being usual can body making steps which are completed prior to the body reaching a position for welding at a welding station C.

Such a can body forming machine may be of the type disclosed in the W. A. Smith and M. E. Widell Patent 1,534,422, issued by the United States Patent Office on April 21, 1925, and entitled "Holding fixture for electric welding of side seams of container bodies."

The supporting horn 13 is carried in a frame part 14 which may be a part of or connected to the main frame 11. The horn is usually of the collapsible type, although for the sake of simplicity it is not so shown in the present embodiment.

The can body A when on the horn 13 is held in welding position by side wings 21 which are pivoted at 22 on the frame part 14. These wings may be moved out in any suitable manner to allow for positioning of the can body, as by actuation through connecting links 23. Feed bars 24 are illustrated and these may slide in the wings 21 to move the can bodies longitudinally of the horn 13 in the usual manner. By means of such bars the body A is brought into welding position C on the horn and after welding may be slid off of the horn in a direction longitudinally of the latter.

A stationary electrode 25 is illustrated in Fig. 3 as being inserted centrally of the horn 13, the bottom edge of the electrode engaging against lapped ends or edges D of the can body A. The inner wall of the body where it is lapped is in direct engagement with the bottom of the stationary electrode and the electrode will be suitably wired and connected into the welding circuit of the apparatus.

The movable electrode B comprises a roller disc member 31. It is adapted to be moved along the lapped seam section of the can body as the body is held on the horn 13 in its welding position C by the wings 21. In this embodiment the side seam D is below the horn and therefore the movable electrode disc 31 is below the seam.

During this longitudinal or traverse movement, the electrode 31 rotates on its own axis and cooperating with the stationary electrode 25, effects a stitch or continuous spot welding of the seam parts D, the lower electrode also being in electrical connection with the welding energy of the apparatus. The disc 31 may be positively rotated or it may rotate by reason of its engagement against the seam. It will be assumed that the latter condition prevails.

The disc 31 is bolted at 32 onto an electrode body 33 which is formed with an integral longitudinal shaft section 34 and a shaft extension 35. The shaft parts 34, 35 constitute a single axis shaft for the electrode and extend on opposite sides of the body 33. Such a shaft is journaled at 36 in suitable bearings formed in spaced bracket arms 37 which are connected at their lower ends to a base 38.

The base 38 is mounted on an insulating slide plate 39 which in turn is secured to a slide member 41. This slide member is movable back and forth in any suitable manner as by connection through links 42 pivotally connected at 43 to a depending lug 44 projecting down from the slide member.

The slide member 41 is disposed in guideways 45 formed in the table 12 and is held against displacement by insulated slide gibs 46 secured to the table. By means of this construction, the electrode B is moved back and forth with the reciprocation of the slide 41 for the welding action. This provides for the traversing of the electrode along the can body seam and at the same time insulates the electrode from the machine frame.

The shaft part 34 (Figs. 1 and 3) projects beyond its bearing and extends through a packing collar 51 which is threadedly secured in a cooling head section 52 formed on one of the bracket arms 37. The shaft part 34 and also the electrode body 33 are provided with suitable channels to permit circulation of a cooling medium such as water in order to disperse a part of the heat of the movable electrode which becomes heated during the welding operation.

For this purpose the electrode body 33 is formed with a pair of concentric channels 55 (Figs. 2 and 3) which are formed in one face of the body adjacent its connection with the electrode disc 31. These two channel members 55 are preferably connected by a transverse channel 56 in a manner that permits the circulating medium to flow into one channel 55, thence to the other one and out from the latter.

The shaft part 34 is formed with a pair of parallel longitudinally disposed channels 57. The inner end of one channel 57 communicates with the entrance end of the inner circular channel 55 and the inner end of the other channel 57 communicates with the exit end of the outer circular channel 55. In the cooling head 52 the outer ends of the channels 57 communicate with suitable ports 58 in the head and shaft which are separated from one another but which individually communicate with cooling fluid pipes 59 threaded in the head. In this way direct communication is provided through the various interconnected channels and passageways for proper circulation of the cooling medium.

The electrode B, including electrode disc 31, body 33 and shaft parts 34, 35, is mounted in its bearings 36 so that it has free transverse movement longitudinally of the axis. Before beginning a welding operation it is set in a proper position between the bracket arms 37 so that the periphery of the electrode disc 31 aligns with the side seam D of the can body A. It is then spring-held in such position by a contact head instrumentality E carried on the end of shaft extension 35 which instrumentality engages a stationary current collector frame member.

The stationary frame member comprises a collector bar 61 (Figs. 1 and 3) which is secured to a bus bar 62 formed with a T-shaped stem 63 which may be electrically connected into the welding circuit. The bus bar is also provided with a foot 64 which is mounted on an insulating strip 65 and the connecting surfaces of the foot and the strip are formed with a tongue and groove.

The strip 65 in turn is mounted on a spacer block 66 carried on a bracket extension 67 of the frame 11. The contacting surfaces of the strip 65 and block 66 may also be formed with tongue and groove which are parallel with the other tongue and groove joint. This permits adjustment of the collector bar 61 at a predetermined distance from the lower electrode after which all adjoining parts are bolted tight in such adjusted position. This will be referred to again as the description proceeds.

Provision is made for cooling the collector bar 61 and for this purpose the inner face of the bar is grooved as at 68 and these grooves are blocked off along the outside by the bus bar 62. There is thus formed cooling channels for circulation of a cooling liquid, such as water. Such channels may be suitably joined one with the other and furthermore connection may be made through ports 69 in the bus bar with pipes 71 of a suitable circulation cooling system.

The shaft section 35 extends beyond its bearing 36 and is tapered at the end as shown at 75 (Fig. 3) to provide a seat for a sleeve 76. The sleeve is tapered on the inside and is pulled tightly onto the end of the shaft extension by a bolt 77 threaded therein. A key 78 is also inserted between the sleeve and the shaft. This construction insures rotation of the sleeve with the electrode 31.

The contact instrumentality E includes a disc 81 and this disc is secured to the sleeve 76 in a flexible connection. This flexibility is obtained by the use of laminated washer plates 82 clamped along their outer edges between a peripheral inside rim 83 formed on the inner face of the disc 81 and a clamping ring 84 which is fastened to the disc by bolts 85. The inner edges of the laminated washer plates are clamped between a flange head 86 of the sleeve 76 and a slide collar 87, screws 88 being passed through the laminated parts and threadedly secured in the flange head.

A button 89 is located in the end of the sleeve 76 just over the head of the bolt 77 and provides a central support for the contact head, the inside center of the disc 81 being yieldingly held against the button by the washer plates 82 so that the disc can rock about this central point as a pivot. By means of this construction it will be seen that the contact disc 81 is flexibly carried on the end of the shaft extension 35 of the lower electrode. This insures a self aligning feature effective at all times to provide a full electrical contact between the face of the collector head or bar 61 and the face of the disc 81.

A spring 91 is interposed between a collar 92 which is mounted on the shaft extension 35 outside of the bearing 36 and the sliding collar 87 of the contact instrumentalities E. The action of this spring is to slide the entire lower electrode parts toward the right, as viewed in Fig. 3, until stopped by the disc 81 striking against the collector bar 61. In setting this lower electrode unit for a welding operation the collector bar 61 and the bus bar 62 are moved over until the collector bar is in the right position. This is made possible by the tongue and groove mountings of the insulating strip 65 already described. In this setting the desired compression may be put on the spring and this in turn determines the amount of pressure exerted by the contact disc upon the collector bar.

The contact head disc 81 having rotation with the lower electrode insures a change of contact surface between the head and the collector bar. This prevents wearing of grooves or uneven surfaces between the contact surfaces and insures better electrical contact at all times to permit unrestricted flowing of the welding current. Any flexing of the contact disc is accompanied by a yielding of the laminated washers 82 and these in turn are always backed up by the spring 91 which provides a further flexibility. There is thus no binding of the electrode in its bearings and it is always floating, in a sense, but without any danger of interruption of welding current throughout all phases of the flexibility of the parts.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An electric welding and connecting unit for electrodes of welding apparatus, comprising in combination, a frame element, an electrode having bodily longitudinal movement relative to and along said frame element during a welding operation, flexible instrumentalities carried by said electrode, said flexible instrumentalities including a member having sliding contact longitudinally of said frame element while also having rotation on its own axis, for producing a uniform electric connection therebetween and providing for conduction of the welding current to and from said electrode for the welding operation, and means for moving said electrode relative to and longitudinally of said frame element for said welding operation.

2. An electric welding and connecting unit for electrodes of welding apparatus, comprising in combination, a stationary frame member mounted in said apparatus, an electrode having movement relative to and adjacent said frame member during a welding operation, flexible instrumentalities carried by said electrode, said instrumentalities including a rotary disk member having sliding engagement and contact with said frame member, pressure means carried by said instrumentalities for holding said disk member against frame member to obtain a uniform constant electric connection therebetween whereby to insure continuous conduction of the welding current to and from said electrode for the welding operation, and means for moving said electrode relative to said frame member during said welding operation.

3. An electric welding and connecting unit for electrodes of welding apparatus, comprising in combination, a stationary support for holding work to be welded, a stationary electrode mounted in said support and having contact with the work, a rotatable electrode having rolling contact over said work while clamping the same between both electrodes for a welding operation, a stationary frame member mounted in said apparatus, flexible instrumentalities carried on said rotatable electrode including a rotary disk member having rotary sliding pressure contact with said frame member for producing a uniform electric connection therebetween to insure uninterrupted conduction of the welding current to and from said rotatable electrode for the welding operation, means for exerting pressure against said disk member to hold the same against said frame member, and means for bodily moving said rotatable electrode and said disk relative to said frame member during the welding operation.

4. An electric welding and connecting unit for electrodes of can body welding apparatus, comprising in combination, a stationary horn for supporting the can body to be welded, a stationary electrode included in said horn and joined with the welding circuit of the apparatus, a bodily movable rotatable electrode mounted for passage along said can body while on said horn and having cooperation with said stationary electrode for welding seam parts in said body, a stationary current collector bar secured to the frame of the apparatus and joined with the welding circuit, flexible instrumentalities carried by said movable electrode, said instrumentalities including a disk member rotatable with said movable electrode and having sliding contact with said bar to provide an electrical connection between the movable electrode and the said collector bar irrespective of the positions of the movable electrode on the can seam and said disk member on said collector bar, and means for bodily moving said rotatable electrode and said rotary disk member relative to said collector bar during a welding operation.

5. An electric welding and connecting unit for electrodes of can body welding apparatus, comprising in combination, a stationary horn for supporting the can body to be welded, devices for holding the can body to desired shape and size on said horn with overlapping seam parts in position for welding, a stationary electrode located in said horn and joined in the welding circuit of the apparatus and engaging one side of the seam of said held can body, a rotatable electrode, means for moving said rotatable electrode along said can body seam for clamping the seam parts between the two electrodes during welding, a stationary bar carried in the frame of the apparatus adjacent the path of travel of said rotatable electrode and joined with the welding circuit, and spring pressed instrumentalities including a rotatable disk member carried by said rotatable electrode and having constant rotary and sliding contact with said bar for electrically connecting the rotatable electrode into the welding circuit through said bar for all positions of said movable electrode.

6. An electric welding and connecting unit for electrodes of welding apparatus, comprising in combination, a frame member mounted in said apparatus, an electrode having movement relative to said frame member during a welding operation, flexible instrumentalities carried by said electrode, said flexible instrumentalities including a rotary disk member journaled on the axis of said movable electrode, said disk member having rotary and sliding contact with said frame member to obtain a uniform electric connection therebetween and providing for continuous conduction of the welding current to and from said electrode for the welding operation, means for cooling said electrode and also said frame member to minimize the heat of welding in the said parts, and means for moving said electrode relative to said frame member for and during said welding operation.

7. An electric welding and connecting unit for electrodes of welding apparatus, comprising in combination, a stationary frame member mounted in said apparatus, a rotatable roller disc electrode having longitudinal movement relative to said frame member during a welding operation, and flexible instrumentalities carried on said electrode and including a contact head coaxially disposed and rotatable with the electrode, said head having sliding contact with said frame member being yieldably mounted for pivotal movement about the axis of said electrode to adjust its contacting surface on the contacting face of said frame member for producing a uniform electric connection therebetween and providing for conduction of the welding current to and from said electrode for the welding operation.

8. An electric welding and connecting unit for electrodes of can body welding apparatus, comprising in combination, a frame, a horn carried in said frame for supporting a can body with its overlapping seam parts in position for welding, a stationary electrode carried in said horn and contacting the inside of said can body seam, a slide located adjacent said horn and having sliding movement in said frame, a roller disc electrode journaled for rotation in said slide, means for moving said slide back and forth to cause said disc electrode to roll along and contact the outside of said can body seam and in cooperation with said stationary electrode to insure proper passage of the welding current between said electrode and through said seam to weld the latter, a stationary current collector bar carried on said frame at one side of said slide, a rotatable contact head carried by said disc electrode, and flexible means interposed between said disc electrode and said collector bar to provide for passage of the electric current to and from said disc electrode.

9. An electric welding and connecting unit for electrodes of can body welding apparatus, comprising in combination, a stationary horn for supporting the can body to be welded, a stationary electrode included in said horn and joined with the welding circuit of the apparatus, a movable electrode mounted for passage along said can body while on said horn and having cooperation with said stationary electrode for welding seam parts in said body, a stationary current collector bar secured to the frame of the apparatus and joined with the welding circuit, flexible instrumentalities carried by said movable electrode and having sliding contact with said bar for forming electrical connection between the movable electrode and the said collector bar, said instrumentalities comprising a contact disc, a sleeve member secured to said movable electrode and flexible connecting devices interposed between said disc and sleeve and allowing for relative movement between said disc and said movable electrode, and spring means for yieldingly holding said contact disc against said collector bar.

MAGNUS E. WIDELL.